Jan. 27, 1959

T. L. FAWICK 2,870,813

RESILIENT WHEEL ASSEMBLY

Filed June 6, 1955

INVENTOR.
THOMAS L. FAWICK
BY
*Willard D. Eakin*

ATTORNEY

Jan. 27, 1959  T. L. FAWICK  2,870,813
RESILIENT WHEEL ASSEMBLY
Filed June 6, 1955  2 Sheets-Sheet 2

INVENTOR.
THOMAS L. FAWICK
BY Willard D. Eakin
ATTORNEY

2,870,813
RESILIENT WHEEL ASSEMBLY

Thomas L. Fawick, Cleveland, Ohio

Application June 6, 1955, Serial No. 513,251

2 Claims. (Cl. 152—44)

This invention relates to rubber-cushioned rotary assemblies comprising an inner wheel element, such as a vehicle-wheel body, an annular outer wheel element, such as a tire or a tire-carrying rim, surrounding the said inner wheel element, and cushions formed of rubber or rubber-like material maintaining the said wheel elements in functional relationship but insulating them from each other.

The chief objects of the invention are to provide such an assembly having the advantages of economy of manufacture; ease of assembly; a desirable degree of cushioning as to relative movement of the two wheel elements in all directions of relative movement; good ventilation for cooling of the cushioning means and of associated parts, such as a brake drum; durability of the assembly; and ease of substitution of parts, as for repair of the assembly.

A further object is to provide an assembly of this type as a vehicle wheel with but little modification of wheel elements now commonly used in vehicle wheels.

Figure 1:
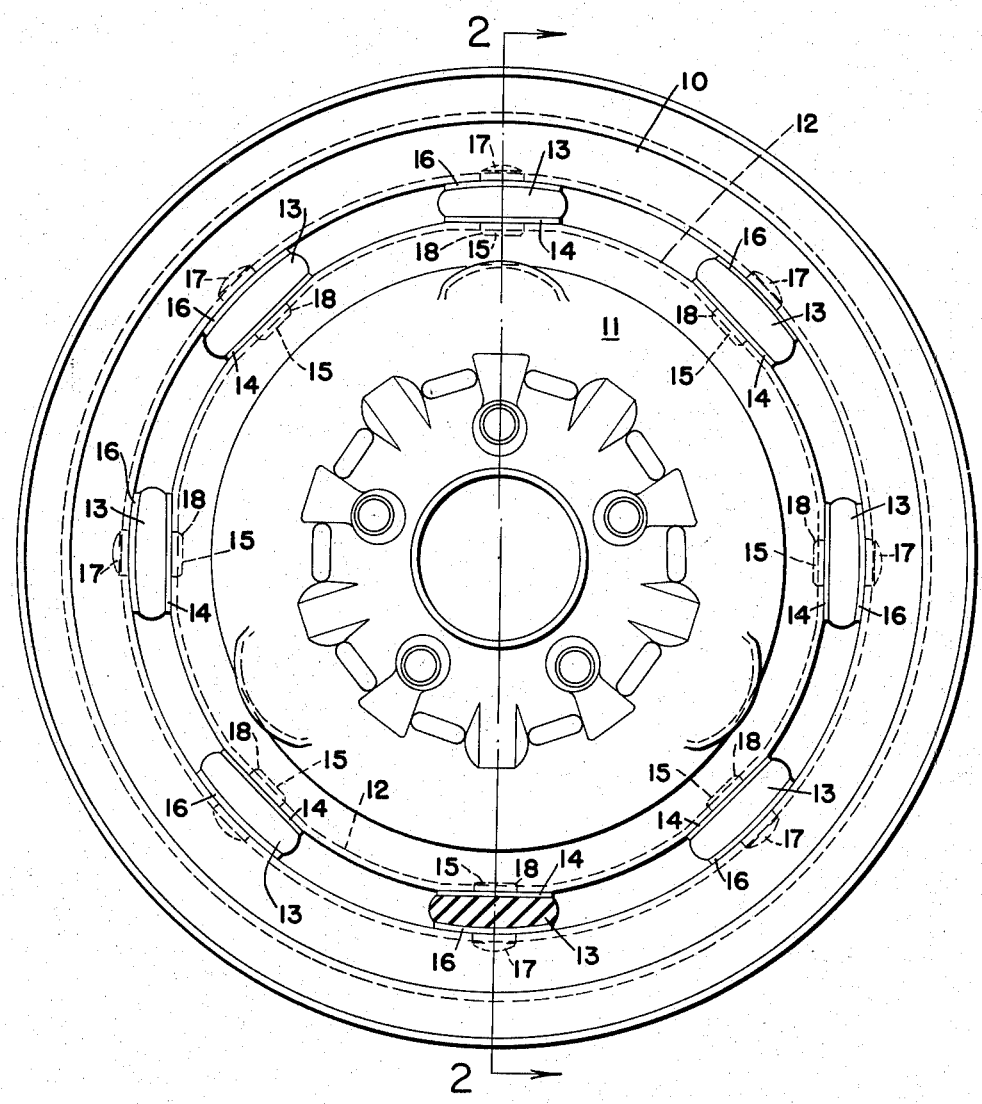
Fig. 1 is an elevation of a vehicle wheel embodying my invention in its preferred form, with a part sectioned for further illustration.

The embodiment chosen for illustration in the accompanying drawings is a vehicle-wheel assembly adapted to be equipped with a pneumatic tire, not shown. It comprises a tire-carrying rim 10 here shown as being of a standard type except that in the floor of its base it is formed with a set of circumferentially spaced sockets or holes for the anchoring of respective cushioning units presently to be described.

It comprises also a wheel body 11 here shown as being of a standard type except that at its outer periphery it is formed with a laterally projecting, generally cylindrical, flange 12 formed with a set of circumferentially spaced sockets or holes, radially aligned with the respective holes in the rim 10, for anchorage of the respective cushioning units.

Each of the said cushioning units comprises a cushion body 13 of material having substantially the resilient deformability of vulcanized soft-rubber, a metal plate 14 secured to the radially inner face of the cushion body, as by surface bonding such as vulcanized adhesion; a central stud 15 secured to the plate 14, as by welding, adapted to fit in one of the holes in the wheel-body flange 12; a metal plate 16 secured to the radially outer face of the cushion body, as by vulcanized adhesion; and a central stud 17 secured to the plate 16, as by welding, and adapted to fit in one of the holes in the base of the tire-carrying rim.

Preferably the plate 14 is flat, in which case the wheel-body flange 12 is formed with corresponding flats for stability of seating of the respective plates 14. Preferably the plate 16 is cylindrically curved to fit against the inner surface of the base of the tire-carrying rim.

Preferably the stud 15 is square, or at least polygonal, the hole in which it fits of course being of complemental shape, and preferably its corners as at 18 are beveled for guiding it into the hole.

Preferably the stud 17 is of generally cylindrical form, the hole in which it fits of course being of complemental shape, and preferably its outer face is domed as shown, for guiding it into the hole.

Figure 2:
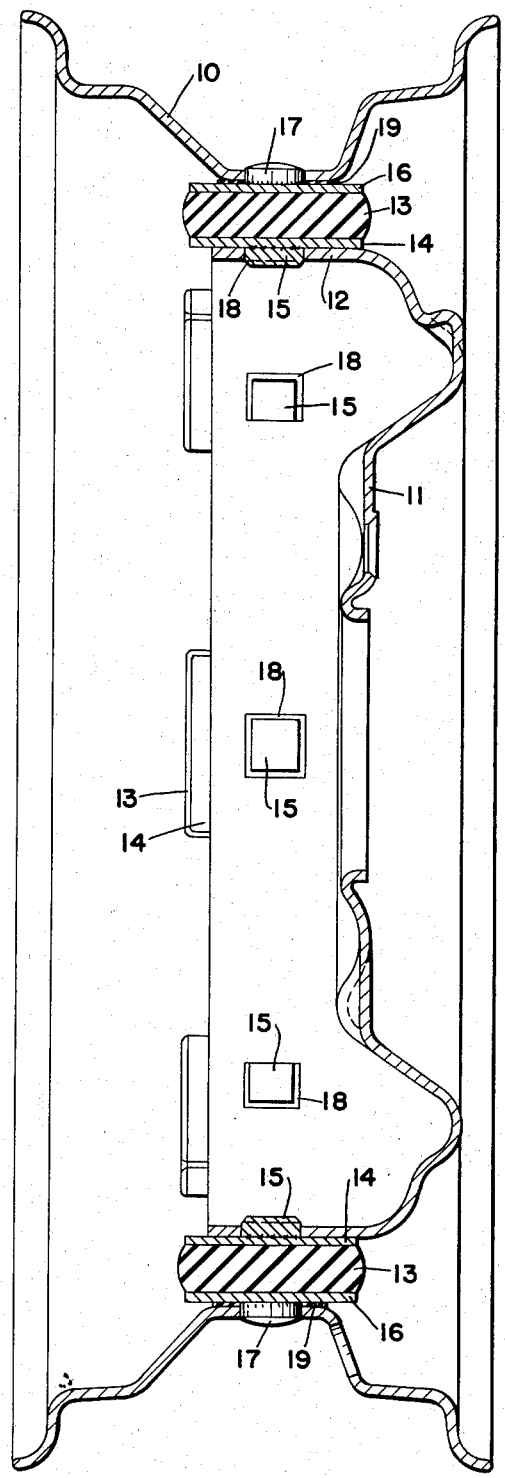
Fig. 2 is a section of the same on line 2—2 of Fig. 1.
Figure 3:
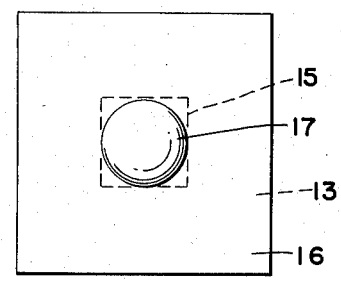
Fig. 3 is a top plan view of one of the cushioning units.
Figure 4:
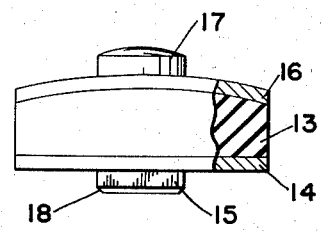
Fig. 4 is an elevation of the unit shown in Fig. 3, with a portion sectioned and broken away.

As will be manifest from a comparison of Fig. 4 with Fig. 1 or Fig. 2, the cushioning unit as it comes from the vulcanizing mold, in unstrained condition, is radially thicker than the space between the rim and the wheel body that it is to occupy, which of course means that it is to be mounted between the two under substantial radial compression with corresponding deformation and radial thinning of the cushion body 13.

Various procedures for so mounting all of the cushioning units of the set under such radial compression will occur to those skilled in the art, but a simple expedient is, by the use of suitable means not shown, to move the wheel body to various eccentric positions in relation to the rim, to provide temporarily ample space for the cushioning units to be moved in succession, or in successive groups, into position for their studs to enter their respective holes in the rim and the wheel body upon relative movement of the two back to concentric relation; and finally permitting them to assume that relation under the balancing recoil forces of the cushioning units, the dimensions being such that all of the cushioning units are then under the same degree of radial compression.

The studs 15 and 17, as snap-in interlock means are of such moderate length that only moderate spreading apart of the adjacent parts of the rim and wheel body is necessary for permitting the insertion of the studs in their holes, and yet sufficient compression of the rubber is obtained to provide an assembly having good stability, because of the wide seating of each cushion in proportion to its radial thickness, the cushioning rubber member being of biscuit shape.

The forming of at least one of the studs of such shape that it interlocks with the wall of its hole against relative rotation is desirable for securely holding a rectangular cushioning unit against rotation, to provide between each cushioning unit and the next a ventilating space of maximum size, for air-flow capacity. It is not imperative that the cushioning units be rectangular, but I prefer that shape for economy in the making of suitable molding equipment and also for maximum ventilating spaces for a given amount of cushioning material in each one of identical cushioning units.

As all of the cushioning units are alike, and can be completely manufactured apart from the wheel rim and the wheel body, they can be produced very economically.

In the completed assembly the cushion bodies 13, insulating the wheel rim from the wheel body, cushion the vehicle against road shocks with the small weight of the rim and the tire as the only "unsprung weight," and their compression and their relationship is such that they resist with desirable strength axial offset or angular misalignment of the rim and wheel body such as would permit undesirable side-sway of the vehicle, as in going around a curve. Yet they have sufficient yieldably to permit and cushion slight relative movement of the rim and wheel body transversely of the vehicle. They also desirably cushion the torque in the case of either acceleration or breaking of the vehicle.

Preferably each cushion body 13 is anchored wholly by being surface bonded to the plates 14 and 16, so that maximum cushioning effect is obtained for a given amount of rubber, and chafing of the rubber, such as occurs in the use of clamps, is avoided.

For use with tubeless tires, each cushioning unit can be sealed to the radially inner face of the base of the rim, around the hole occupied by the stud 17, by a rubber gasket 19, Fig. 2.

The cushioning members 13 being of simple biscuit shape, as shown in the drawings, and being held in place wholly by surface bonding of their radially inner and outer faces to the metal plates 14 and 16 respectively, the construction as shown and described is such that the cushioning members sustain primarily in shear both the torque forces and the side-sway forces and thus provide great stability of the structure while adequately cushioning it as to those forces and also as to load-supporting forces in the case of a vehicle wheel.

Modifications are possible wthout departure from the scope of the invention as defined in the appended claims.

I claim:

1. An assembly comprising an inner wheel element, an annular outer wheel element surrounding a part of said inner wheel element in radially spaced relation thereto and thus defining therewith an annular cushion-receiving space, and a set of circumferentially spaced apart cushioning units mounted in said space, each of said units comprising a biscuit-shaped cushioning body of greater extent circumferentially than radially of the wheel and providing opposite, extensive, at least approximately planar supporting faces and formed of material having substantially the resilient deformability of vulcanized soft-rubber and a pair of plates extending only at substantially right angles to the local radius of the wheel and surface bonded to the said extensive faces respectively of the biscuit-shaped cushioning body, the cushioning bodies of the several units insulating said wheel elements from each other, all of said cushioning bodies being held under deforming radial compression at least primarily by reason of the radial thinness of the space between the said wheel elements, and each unit comprising snap-in means rigid with the respective plates and interlocking said plates individually with the said wheel elements respectively again relative circumferential movement and against relative axial movement of said wheel elements, so that the said cushioning bodies sustain the circumferential forces and the axial forces primarily in shear.

2. An assembly as defined in claim 1 in which the defined snap-in interlocking means for each of the defined plates is a stud rigidly projecting, radially of the assembly, from the plate.

References Cited in the file of this patent

UNITED STATES PATENTS

| 634,954 | McKinnon | Oct. 17, 1899 |
| 1,213,834 | Bunzlau et al. | Jan. 30, 1917 |
| 2,520,560 | Paton | Aug. 29, 1950 |
| 2,672,906 | MacLean | Mar. 23, 1954 |

FOREIGN PATENTS

| 580,395 | Great Britain | Sept. 5, 1946 |